L. T. BARNES.
WATER METER.
APPLICATION FILED APR. 11, 1914.
1,127,849.
Patented Feb. 9, 1915.
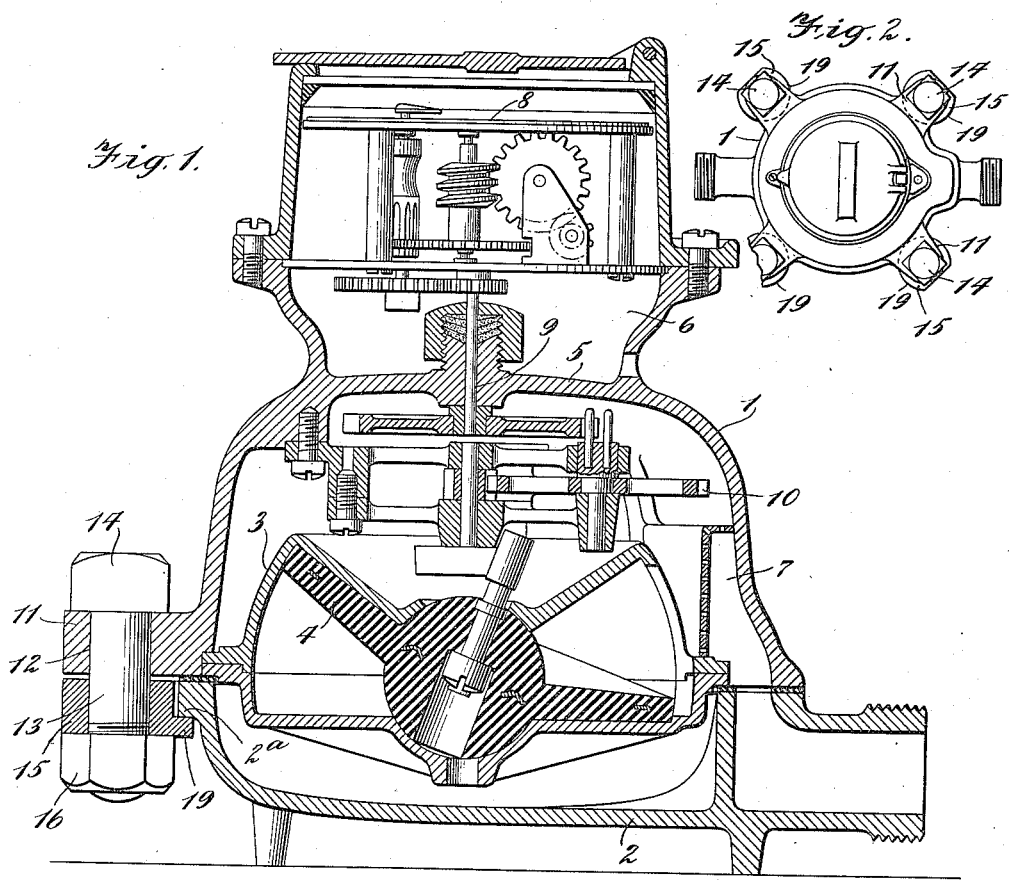
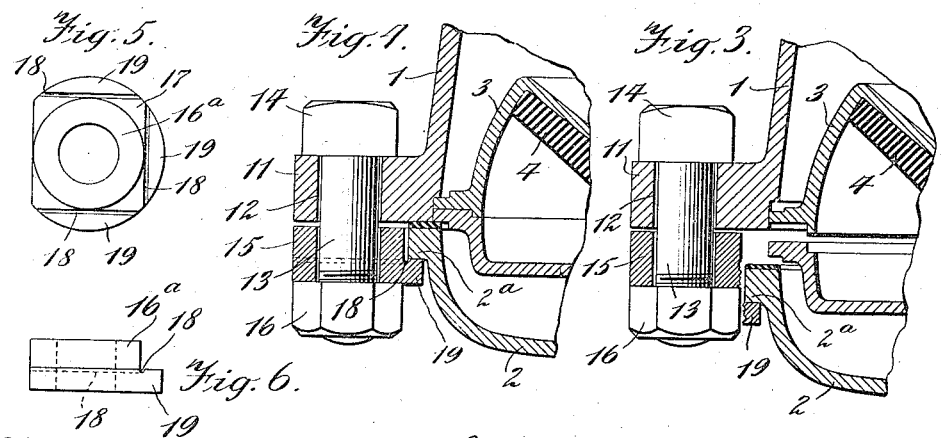
Witnesses:
Geo. C. Cheney
E. M. Lockwood.
Llewellyn T. Barnes Inventor
By his Attorneys Gifford & Bull

UNITED STATES PATENT OFFICE.

LLEWELLYN T. BARNES, OF SEA CLIFF, NEW YORK, ASSIGNOR TO NATIONAL METER COMPANY, OF NEW YORK, N. Y., A CORPORATION OF NEW YORK.

WATER-METER.

1,127,849.  Specification of Letters Patent.  Patented Feb. 9, 1915.

Application filed April 11, 1914. Serial No. 831,114.

*To all whom it may concern:*

Be it known that I, LLEWELLYN T. BARNES, a citizen of the United States, residing at Sea Cliff, Long Island, in the county of Nassau and State of New York, have invented certain new and useful Improvements in Water-Meters, of which the following is a specification.

My invention relates broadly and generally to new and useful improvements in water meters, and particularly contemplates an improved construction to prevent injury to the internal mechanism of a water meter in case the liquid contained therein freezes and by expansion tends to disrupt the casing containing such mechanism. I am aware that in the prior art it was old to provide the casing of a water meter with a wall so constructed that it alone would break or be dislodged in case of freezing, so that the break would occur at a point least dangerous to the mechanism contained in the casing. This construction, however, had its disadvantage in that the freezing broke or dismembered the casing so that it was necessary to replace the broken wall of the casing in order to put the meter in working condition.

It is the primary object of this invention to overcome the disadvantage above stated, which I accomplish by connecting a separable wall of the meter casing to the casing body by frangible means so arranged and constructed that, should the expansion of the water due to freezing within the casing tend to force said wall out of its proper position, the wall will not be broken or injured, but the frangible means will break and permit the wall to move out of normal position without injury to it or the meter mechanism.

The invention consists in the construction and arrangement of parts to be more fully described hereinafter and the novelty of which will be particularly pointed out and distinctly claimed.

I have fully and clearly illustrated my invention in the accompanying drawings to be taken as a part of this specification and wherein:

Figure 1 is a vertical central sectional view through one type of water meter constructed in accordance with my invention. Fig. 2 is a plan view of the construction shown in Fig. 1. Fig. 3 is a detail sectional view of a portion of the meter casing shown to the left of Fig. 1 showing the position taken by the parts upon breakage of the fastening device and derangement of the parts due to freezing. Fig. 4 is a detail sectional view of the fastening device and the adjoining parts connected thereby in the positions shown in Fig. 1, but with a modified form of fastening device. Fig. 5 is a plan view of the fastening device shown in section in Fig. 4, and Fig. 6 is a view in side elevation of the device shown in Fig. 4.

Before proceeding with the detail description of my invention, I would state that, while I have shown it in connection with a particular type of water meter, I desire it understood that the invention is not limited to such type, but may be applied with or without modification to other types of water meters without departing from the spirit and scope of my invention.

Referring to the drawings by characters of reference: 1 designates generally the main body of a meter casing resting upon a base portion 2 which constitutes a wall closing the base of the meter casing 1 and forming therewith a piston chamber containing the piston box 3 and nutating piston 4. The main body 1 of the casing is divided by the transverse partition 5 into upper and lower chambers 6, 7, the upper chamber containing the registering or indicating mechanism 8 connected by a shaft 9 with transmission mechanism 10 in the upper portion of the lower chamber, which transmission mechanism is driven from the piston 4 in a well-known manner.

The main body 1 of the casing is provided at its lower portion with laterally-projecting lugs or ears 11, each having an opening 12 to receive a fastening bolt 13, the head 14 of which engages the upper surface of the ear. Each of these bolts, at the end opposite to its head, extends beyond the meeting edges of the portions 1, 2, of the casing and carries a frangible fastening device 15 adapted to overlie a flange $2^a$ on the edge of the base portion 2 abutting the base of the casing 1, to hold the base 2 of the casing in engagement with the body 1. The frangible device on each bolt is held in place thereon by a clamping nut 16 threaded on the bolt, by means of which said device is moved into engagement with said flange $2^a$ and holds the parts 1 and 2 of the casing in water-tight engagement. This nut is preferably of such diameter as not to overlie the edge portion of the washer and prevent breaking of the latter when the casing parts are forced apart.

The fastening devices may take a number of forms within the spirit and scope of my invention, but I prefer to form each with a cylindrical collar or sleeve 15 adapted to surround a bolt 13, and provided at the end away from the ears 10 with a circumferential circular flange 17, the upper surface of which may be scored or grooved as at 18 on lines tangential to the cylindrical body 15 to provide a plurality of projections 19, any one of which is adapted to project beneath the flange 2ª on the bottom part 2 of the casing to hold the parts of the casing together. The score lines or grooves shown in Figs. 3, 4 and 5 may be omitted if desired, as shown in Fig. 1, but I prefer to employ them because the flange or projection will break along determined lines in a regular manner which will enable re-use of the frangible device for a number of times. It will be noted that the said score lines or grooves do not intersect and that they extend to the extreme end of the flange, so that the breakage of one projection 19 will leave the others intact for future use. The fastening devices are preferably rotatable on the bolts 13, so that, when one flange 19 is broken off, as hereinafter described, the fastening device may be readily rotated to bring another of said flanges or projections in position to overlie the flange 2ª when the meter is again assembled or set up.

In the preferred embodiment of the invention adopted for commercial purposes I prefer to form both the main body of the casing 1 and the base 2 of a similar material—for instance, a non-corrodible metal, such as bronze, which will be sufficiently strong to stand the excessive strains exerted thereon by the freezing of water within the meter, and I form the fastening devices 15, and their flanges, preferably of an easily frangible brittle metal, such as cast iron, although other materials than cast iron may be used.

In a meter constructed in accordance with my invention, the casing wall is not broken because, in case of the freezing of the water and the formation of ice within the casing sufficient to force the parts 1 and 2 apart, said frangible holding means will break before the pressure is great enough to injure the casing wall, and said parts 1 and 2 being released will move apart without being broken.

In reassembling the parts after thawing them out, the fastening devices may each be conveniently rotated to bring an unbroken flange 19 thereof into position to overlie the flange 2ª of the base 2, and, upon tightening up of the nuts 16, said part 2 will be efficiently connected to the part 1.

I preferably leave one of the sides of the washer blank, that is, without a projection, so that said blank side may be turned toward the flange 2ª, to permit separation of the parts 1 and 2. This is important because it obviates necessity of detaching the bolts, washers and nut from the casing part 1, which prevents loss of said parts.

What I claim and desire to secure by Letters Patent of the United States is:

1. In a water meter, a casing having a wall separable therefrom, a fastening device fixed to the casing, and a frangible part on said device and separable therefrom and from said wall and overlying said wall.

2. In a water meter, a casing having a wall separable therefrom, a bolt connecting said casing and wall, and a frangible part on said bolt and separable therefrom and overlying one of said parts to hold them together, the arrangement being such that said casing and wall may separate upon breaking of said frangible part.

3. In a water meter, a casing having a rigid wall separable therefrom, a bolt secured to said casing, and a frangible washer carried by said bolt and overlying said wall, the arrangement being such that said casing and wall may separate upon breaking of said washer.

4. In a water meter, a casing containing a piston chamber, and having a flange, a wall separable from the casing and closing said piston chamber, a bolt extending through said flange, and a frangible member on said bolt and having an edge portion overlying one edge of said separable wall, to hold the chamber and wall together, the arrangement being such that the chamber and wall may separate upon breaking of said member.

5. In a water meter, a casing containing a piston chamber, and having a flange, a wall separable from the casing and closing said piston chamber, a bolt extending through said flange, a frangible washer on said bolt and having an edge portion overlying an edge of said separable wall, and a nut on said bolt to hold said washer in place, said nut being of such diameter as not to prevent breaking of the washer.

6. In a water meter, a casing having a wall separable therefrom, a fastening device fixed to the casing and consisting of a rotatable part having a plurality of frangible projections adapted to overlie said wall.

7. In a water meter, a casing having a wall separable therefrom, a bolt secured to said casing and a washer rotatably mounted on said bolt and having a plurality of frangible projections adapted to overlie said wall.

8. In a water meter, a casing having a wall separable therefrom, a bolt secured to said casing and a frangible part on said bolt having a plurality of flanges adapted to overlie said wall and each having a weakening groove.

9. In a water meter, a casing having a wall separable therefrom, a bolt secured to said casing and a frangible washer rotatably mounted on said bolt and having a plurality of projections adapted to overlie said wall, said washer having a blank space on one side to permit separation of the casing and wall.

In testimony whereof I have hereunto signed my name in the presence of two subscribing witnesses.

LLEWELLYN T. BARNES.

Witnesses:
M. E. McNINCH,
C. G. HEYLMUN.